United States Patent [19]

Borgen et al.

[11] 4,439,909
[45] Apr. 3, 1984

[54] BALL JOINT MANUFACTURE

[75] Inventors: Robert H. Borgen, Winona, Minn.; Harold J. Reindl; Vernon L. Pickering, both of Dayton, Ohio

[73] Assignee: General Motors Corporation, Detroit, Mich.

[21] Appl. No.: 396,347

[22] Filed: Jul. 8, 1982

[51] Int. Cl.³ .............................................. B23P 11/02
[52] U.S. Cl. ...................................... 29/453; 384/279; 384/299; 403/133; 403/134; 403/135; 403/140; 264/242
[58] Field of Search ................... 29/434, 437, 441 R, 29/441 BP, 445, 447, 453, 149.5 B; 403/133, 134, 135, 140; 264/242, 264, 249; 384/279, 299

[56] References Cited

U.S. PATENT DOCUMENTS

| 2,879,091 | 3/1959 | Baker | 403/124 |
|---|---|---|---|
| 2,919,150 | 12/1959 | Baker | 403/27 |
| 2,954,992 | 10/1960 | Baker | 403/140 |
| 3,013,829 | 12/1961 | Marquis | 403/133 |
| 3,037,787 | 6/1962 | Gottschald | 280/668 |
| 3,058,765 | 10/1962 | Thomas | 403/133 |
| 3,068,552 | 12/1962 | Williams et al. | 29/149.5 B |
| 3,089,198 | 5/1963 | Eirhart | 264/242 |
| 3,128,110 | 4/1964 | Herbenar | 403/138 |
| 3,147,537 | 9/1964 | Fadow | 29/445 X |
| 3,233,929 | 2/1966 | Herbenar | 403/140 |
| 3,577,850 | 5/1971 | Harris, Sr. | 264/249 X |
| 3,596,916 | 9/1971 | Gottschald | 277/212 FB |
| 3,671,616 | 6/1972 | Nakata et al. | 264/249 X |
| 3,969,803 | 7/1976 | McCloskey | 29/149.5 B X |
| 4,003,666 | 1/1977 | Gaines et al. | 403/36 |
| 4,260,275 | 4/1981 | Chevallier | 403/133 |
| 4,290,181 | 9/1981 | Jackson | 264/242 X |

FOREIGN PATENT DOCUMENTS

| 38-14830 | 8/1963 | Japan | 264/242 |
|---|---|---|---|
| 1532690 | 11/1978 | United Kingdom | 384/297 |

Primary Examiner—Charlie T. Moon
Assistant Examiner—Ronald S. Wallace
Attorney, Agent, or Firm—R. L. Phillips

[57] ABSTRACT

A method of forming a plastic lined ball joint is disclosed using a preheated socket with wider than normal dimensional tolerances and a melt-in-place plastic socket liner which melts on forced contact with the heated socket so as to exactly conform with and seat in the socket whereafter the assembly is then quenched to solidify the liner to effect a tight fit with the socket.

3 Claims, 5 Drawing Figures

BALL JOINT MANUFACTURE

This invention relates to the manufacture of ball joints and more particularly to a method of forming a ball joint having a preformed plastic socket liner disposed between a metal ball and socket housing wherein a tight fit is required therebetween.

In the manufacture of plastic lined ball joints for use on vehicle steering knuckles and the like requiring precise motion transmittal, the tolerances must be very tight on the plastic socket liner, socket housing and ball stud in order to prevent excessive relative movement which through use could cause substantial wear of the liner as a result of vibration. Up to now, these close tolerance limitations have required an expensive machining operation on the socket housing.

According to the present invention, there is provided a method of forming the ball joint with the final close tolerances required by using a wider tolerance socket housing and an oversized preformed plastic socket liner which melts into the housing to achieve a tight fit. In the formation of the joint, the liner is forced onto the ball and the socket housing is heated to a predetermined temperature which will melt the plastic liner on contact therewith. The liner with the ball contained therein is then forced into the heated socket housing whereby the latter effects melting of the liner so as to exactly conform with and seat on a prescribed surface of the socket housing. Finally, the assembled liner, ball and socket housing are quenched to solidify the liner. The cost of manufacturing the socket housing is thus substantially reduced while providing extremely close tolerance.

These and other objects, advantages and features of the present invention will become more apparent from the following description and drawing in which.

Figure 1:
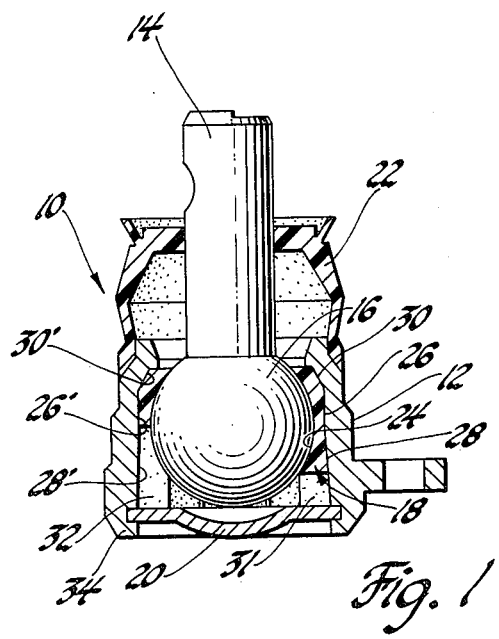
FIG. 1 is a cross-sectional view of a plastic lined ball joint formed according to the present invention.
Figure 2:
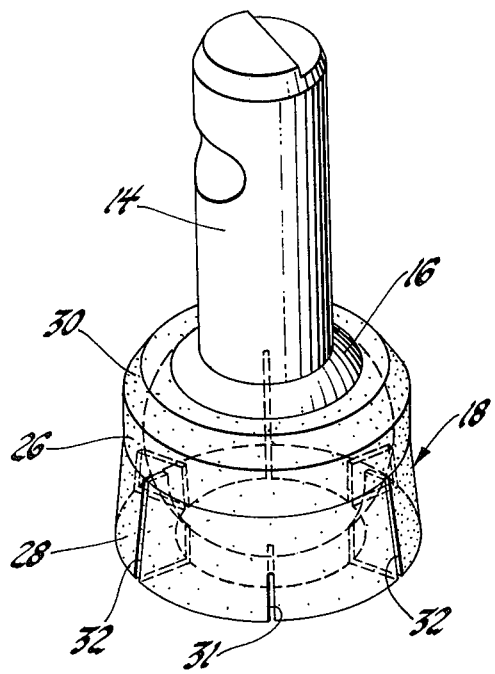
FIG. 2 is an enlarged perspective view of the ball stud and socket liner in FIG. 1.

Referring to FIG. 1, there is shown a plastic lined ball joint 10 adapted for use on a steering knuckle in a vehicle and formed according to the present invention. The ball joint generally comprises a metal socket housing 12, a metal ball stud 14 and a preformed plastic liner 18 disposed between the stud's ball portion 16 and the socket housing. The socket liner 18 is made of a rigid thermoplastic material with a low coefficient of friction to serve as a good bearing surface between the metal ball and socket housing. In addition, the joint is filled with grease which is retained therein by a metal cap 20 that closes one end of the socket housing 12 and by an elastomeric seal 22 that closes the opposite end of the socket housing and seals on the ball stud 14 which projects therethrough.

In the particular ball joint design shown, the liner 18 has a spherical interior surface 24 against which the ball portion 16 seats whereas its outer surface is formed with a cylindrical portion 26 at its stud end and an outwardly tapered or conical portion 28 at its ball receiving end. A chamfer 30 is formed on the inner corner of the liner (i.e. the stud end) while the other end of the liner is formed with a plurality of alternately short and long axial length radial end slots 31 and 32 to provide for radial expansion of the liner to allow the ball portion 16 to be snap fitted and thereafter tightly retained in the spherical interior 24. The socket housing 12 is formed with a longitudinal cross-sectional bore configuration conforming to the outer surface of the socket liner 18, the socket housing's corresponding internal conformations being identified by the same numbers only primed. In the formation of the joint as described in more detail later, the chamfer 30 on the socket liner provides for guided entry of the liner 18 into the socket housing at the tapered bore portion 28' with the socket liner eventually being fully seated in the socket housing upon their respective seating surfaces fully engaging each other.

For the indicated vehicle usage, the tolerances must be very tight in order to prevent excessive relative movement which through use could cause substantial wear of the liner because of vibration (e.g. tolerances of ±0.05 mm on the socket liner, socket housing and ball stud were found necessary to preclude such a problem). Normally, this can be readily accomplished in such a ball joint arrangement so far as the ball and socket liner are concerned but not as to the socket housing which requires an expensive internal machining operation in order to achieve the close tolerance with the preformed plastic liner.

According to the present invention and in lieu of requiring an expensive internal close tolerance machining operation on the socket housing 12, the plastic liner 18 is formed so as to have a standard tight clearance fit with the ball 16 but a predetermined oversize fit with the socket housing 12 which is then formed with a wider than normal tolerance to receive the liner. For example, in an actual construction of the ball joint according to the present invention wherein the ball 16 had a standard spherical diameter of 27.97–28.03 mm and the prescribed seating surfaces 26', 28' and 30' of the socket housing 12 for the liner 18 were then formed with a substantially less costly wider than normal tolerance (e.g. the cylindrical bore portion 26' was formed with a diameter of 31.94–32.00 mm). The plastic liner 18 was then formed with a spherical diameter of 28.08–28.12 for its ball seating surface 24 so as to have a tight sliding fit with the ball with a nominal standard clearance of 0.10 mm while the diameter of its cylindrical socket housing seating surface 26 was formed at 32.00–32.06 mm so as to have a nominal nonstandard oversize fit of 0.05 mm with the exemplary corresponding surface 26 of the socket housing with its wider than normal tolerance. As a further example, it was found that the tolerance band for this particular socket housing seating surface could be made even wider with the mean or nominal dimension shifted downward in size to provide more interference fit as allowed by the melted-in-place concept herein disclosed. In similar manner, the socket housing's other liner seating dimensions for the surfaces 28' and 30' are determined.

Figure 3A:
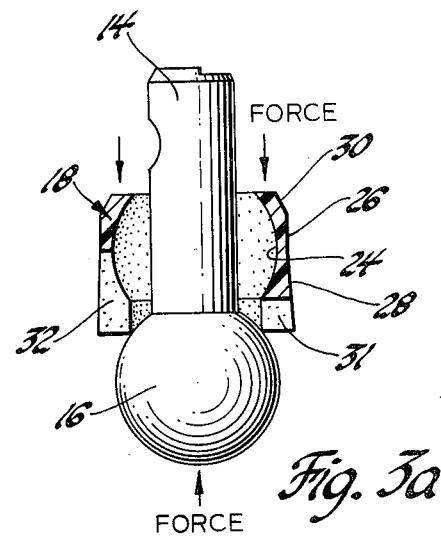
FIGS. 3a, 3b and 3c show various steps in the formation of the plastic lined ball joint in FIG. 1.
Figure 3B:
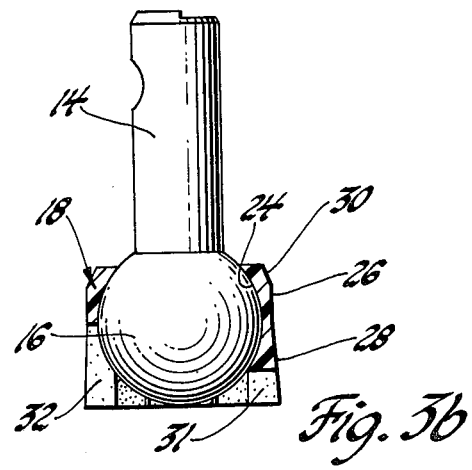
Figure 3C:
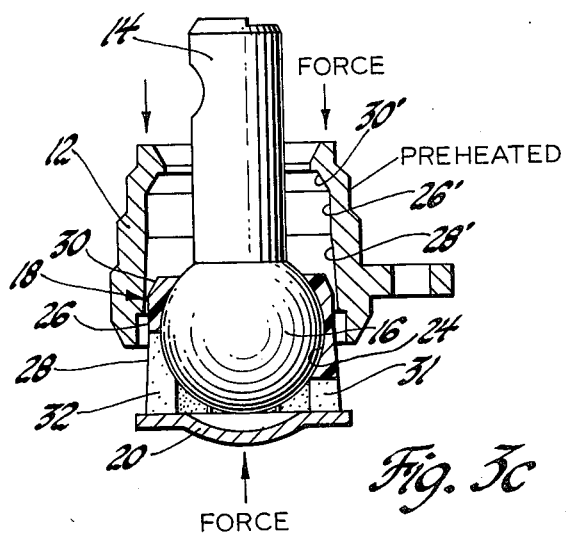

Describing now the formation of the joint, the plastic liner 18 is forced onto the ball 16 as shown in FIGS. 3a and 3b and the socket housing 12 is heated separate therefrom to a predetermined temperature which will melt the surface of the plastic liner 18 on contact therewith. In the preferred construction, the plastic liner 18 was made of acetal plastic which melts at about 350° F. and it was found that by heating the metal socket housing to about 450° F. the necessary melting of the liner will occur. The liner 18 with the ball stud 14 contained therein is placed into the preheated socket housing 12 and then the liner and housing are forced together until properly seated using the housing cap 20 as shown in FIG. 3c. During this operation, the heat of the socket housing effects melting of the liner so as to cause the latter to exactly conform with and seat on the entire prescribed seating surface of the socket housing. This assembly or at least the socket housing is then quenched to solidify the plastic liner to thereby effect a melted in place tight fit between the liner and the socket housing while the standard fit between the socket liner and ball is retained. Following these steps, the cap 20 is fixed in place by spinning over the socket housing edge 34 and finally the seal 22 is assembled to complete the ball joint assembly.

The above described preferred embodiment is illustrative of the invention which can be modified within the scope of the appended claims.

The embodiments of the invention in which an exclusive property or privilege is claimed are defined as follows:

1. A method of forming a ball joint having a plastic liner disposed between a metal ball and a substantially cylindrical, metal socket wherein a tight fit is required therebetween comprising the steps of: (1) forming the liner so as to have a predetermined sliding fit with the ball and a predetermined oversize fit with the socket, (2) forcing the liner onto the ball, (3) heating the socket to a predetermined temperature which will melt the surface of the liner on contact therewith, (4) forcing the liner with the ball contained therein into the heated socket whereby the heat of the latter effects surface melting of the liner so as to conform with and seat on a prescribed surface of the socket, and (5) quenching at least the socket to solidify the liner whereby there is effected a tight assembled fit between the liner and the ball and also between the liner and the socket such that the tight fit between the ball and liner permits relative motion therebetween and the tight fit between the liner and the socket prevents relative motion therebetween.

2. A method of forming a ball joint having a plastic liner disposed between a metal ball and a substantially cylindrical, metal socket wherein a tight fit is required therebetween comprising the steps of: (1) forming the liner so as to have a snapped in place sliding fit with the ball and a predetermined oversize fit with the socket, (2) forcing the liner with a snap fit onto the ball, (3) heating the socket to a predetermined temperature which will melt the surface of the liner on contact therewith, (4) forcing the liner with the ball contained therein into the heated socket whereby the heat of the latter effects surface melting of the liner so as to conform with and seat on a prescribed surface of the socket, and (5) quenching the assembled liner, ball and socket to solidify the liner whereby there is effected a tight assembled fit between the liner and the ball and also between the liner and the socket such that the tight fit between the ball and liner permits relative motion therebetween and the tight fit between the liner and the socket prevents relative motion therebetween.

3. A method of forming a ball joint having a plastic liner disposed between a metal ball and a substantially cylindrical, metal socket wherein a tight fit is required therebetween and wherein one end of the joint is closed by a metal cap comprising the steps of: (1) forming the liner so as to have a predetermined sliding fit with the ball and a predetermined oversize fit with the socket, (2) forcing the liner onto the ball, (3) heating the socket to a predetermined temperature which will melt the surface of the liner on contact therewith, (4) forcing the liner with the ball contained therein and the heated socket together using the cap whereby the heat of the socket effects surface melting of the liner so as to conform with and seat on a prescribed surface of the socket, and (5) quenching the assembled liner, ball and socket to solidify the liner whereby there is effected a tight assembled fit between the liner and the ball and also between the liner and the socket such that the tight fit between the ball and liner permits relative motion therebetween and the tight fit between the liner and the socket prevents relative motion therebetween.

* * * * *